United States Patent [19]

Arano et al.

[11] Patent Number: 5,513,008

[45] Date of Patent: Apr. 30, 1996

[54] VARIABLE LENGTH CODING METHOD USING DIFFERENT BIT ASSIGNING SCHEMES FOR LUMINANCE AND CHROMINANCE SIGNALS

[75] Inventors: Yukari Arano; Ken Onishi, both of Nagaokakyo, Japan

[73] Assignee: Mitsubishi Denki Kabushiki Kaisha, Tokyo, Japan

[21] Appl. No.: 223,838

[22] Filed: Apr. 6, 1994

Related U.S. Application Data

[63] Continuation of Ser. No. 665,581, Mar. 5, 1991, abandoned.

[30]     Foreign Application Priority Data

Mar. 5, 1990 [JP] Japan ................................ 2-54003
Apr. 4, 1990 [JP] Japan ................................ 2-90949

[51] Int. Cl.$^6$ ............................... H04N 9/79; H04N 7/12; H04N 5/78; H03M 7/40
[52] U.S. Cl. ........................ 358/310; 358/335; 348/393; 348/396; 341/67; 360/9.1
[58] Field of Search ..................... 358/335, 310, 358/432, 261.1, 261.2, 261.3, 261.4, 432, 433, 426, 427, 909.1; 348/384, 391, 393, 394, 395, 390, 396, 420, 400–402, 409, 416, 415; 360/8, 9.1; 341/67; 364/715.02, 725; H04N 5/76, 5/78, 5/781, 5/782, 5/783, 9/79, 5/92, 5/76, 7/12, 1/411, 1/415, 1/417, 1/419, 11/04, 11/06, 11/20

[56]              References Cited

U.S. PATENT DOCUMENTS

| | | | |
|---|---|---|---|
| 4,275,411 | 6/1981 | Lippel ........................ | 358/13 |
| 4,813,056 | 3/1989 | Fedele . | |
| 4,817,182 | 3/1989 | Adelson et al. ................ | 358/13 |
| 4,887,156 | 12/1989 | Ohki ........................... | 358/133 |
| 4,982,270 | 1/1991 | Tanaka et al. ................ | 358/13 |
| 4,982,290 | 1/1991 | Nishi et al. .................. | 358/310 |
| 4,987,480 | 1/1991 | Lippman et al. ............... | 358/133 |
| 5,051,840 | 9/1991 | Watanabe et al. .............. | 358/432 |
| 5,067,010 | 11/1991 | Ishii et al. .................. | 358/13 |
| 5,103,294 | 4/1992 | Aoki et al. .................. | 358/135 |
| 5,130,786 | 7/1992 | Murata et al. ................ | 358/13 |
| 5,162,898 | 11/1992 | Aono ......................... | 358/133 |
| 5,341,318 | 8/1994 | Balkanski et al. ............. | 364/715.02 |

FOREIGN PATENT DOCUMENTS

| | | |
|---|---|---|
| 00824271 | 7/1983 | European Pat. Off. . |
| 0267578 | 5/1988 | European Pat. Off. . |
| 0353757 | 2/1990 | European Pat. Off. . |
| 2207829 | 2/1989 | United Kingdom . |
| WO8903159 | 4/1989 | WIPO . |

OTHER PUBLICATIONS

"On Adaptive DCT Coding Techniques for Digital Video Recording" Video, Audio and Data Recording, Mar., 1988 IERE.

"New Classes of Binary Codes Constructed on the Basic of Concatenated Codes and Product Codes" IEEE Trans IT, vol. IT–22 No. 4, 1976–7.

Image Processing Algorithms and Techniques by Keith S. Pennington et al, Proceedings SPIE vol. 1244, 12–14 Feb. 1990, pp. 389–405.

HDTV Production: Today and Tomorrow, Symposium Record Broadcast Sessions, 16th International TV Symposium, Montreux, Switzerland, 17–22 Jun. 1989.

An Encoding Procedure and a Decoding Procedure for a New Modified Huffman Code, IEEE Transaction on Acoustics, Speech and Signal Processing, vol. 38, No. 1, Jan. 1990, pp. 128–136.

*Primary Examiner*—Thai Q. Tran

[57]              ABSTRACT

A variable length coding method designed to assign a different number of coding bits in accordance with the information content a sample holds when an analog signal such as a television signal or the like is converted to a digital signal. An assigning method of coding bits used to a luminance signal is different from that used to a chrominance signal. A variable length coding method is further capable of selecting an optimum assigning method in accordance with contents of an original signal from a plurality of determined assigning methods of coding bits. The data related to the plurality of assigning methods of coding bits is recorded on a medium after it is added to a coded digital signal.

16 Claims, 17 Drawing Sheets

Fig. 3

Prior Art

| VALUE | AMPLITUDE CODE | ADDRESS CODE |
|---|---|---|
| 0 | 1 | |
| 1 | 00 | 00 |
| 2 | 011 | 11 |
| 3 | 01010 | 101 |
| 4 | 010011 | 0100 |
| 5 | 0100100 | 1000 |
| 6 | 0101101 | 01011 |
| 7 | 0101111 | 01111 |
| 8 | 01011000 | 01101 |
| 9 | 01011001 | 10011 |
| 10 | 0101110000 | 01100 |
| 11 | 0101110001 | 010101 |
| 12 | 0101110010 | 011100 |
| 13 | 0101110011 | 100100 |
| 14 | 0101110100 | 0111010 |
| 15 | 0101110101 | 01010000 |
| 16 | 01001010000 | 01010001 |
| 17 | 01001010001 | 01010010 |
| 18 | 01001010010 | 011101100 |
| 19 | 01001010011 | 011101101 |
| 20 | 01001010100 | 01010011 |
| 21 | 01001010101 | 011101110 |
| 22 | 01001010110 | 0111011110 |
| 23 | 01001010111 | 0111011111 |
| 24 | 01001011000 | 1001010000 |
| 25 | 01001011001 | 100101000 |
| 26 | 01001011010 | 1001010010 |
| 27 | 01001011011 | 1001010011 |
| 28 | 01001011100 | 1001010100 |
| 29 | 01001011101 | 1001010101 |
| 30 | 01001011110 | 1001010110 |
| 31 | 01001011111 | 1001010111 |
| 32 | (EOB)01000 | 1001011+5 bit |

Fig. 6

TABLE Y

| R\S | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 0 | 3 | 3 | 5 | 5 | 6 | 6 | 7 | 7 | 8 | 8 | 9 | 9 | 11 | 11 | 11 | 13 | 13 | 13 | 13 | 13 | 13 | 14 | 14 | 14 | 14 | 14 | 18 | 18 | 18 | 18 |
| 1 | 4 | 7 | 8 | 9 | 11 | 11 | 13 | 13 | 13 | 14 | 14 | 18 | 18 | 18 | 18 | 18 | 18 | 18 | 18 | 18 | 18 | 18 | 18 | 18 | 18 | 18 | 18 | 18 | 18 | 18 |
| 2 | 6 | 9 | 13 | 13 | 14 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 3 | 7 | 11 | 14 | 14 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 4 | 8 | 13 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 5 | 11 | 14 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 6 | 11 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 7 | 13 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 8 | 13 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 9 | 13 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 10 | 13 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 11 | 14 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 12 | 14 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 13 | 14 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 14 | 14 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 15 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |
| 16 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 | 18 |

Fig. 8

TABLE C

| R\S | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0 | 3 | 4 | 5 | 6 | 7 | 8 | 9 | 11 | 13 | 13 | 13 | 13 | 14 | 14 | 14 | 14 |
| 1 | 3 | 6 | 8 | 11 | 13 | 13 | 14 | 14 | 18 | 18 | 18 | 18 | 18 | 18 | 18 | 18 |
| 2 | 5 | 7 | 11 | 13 | 14 | 18 | 18 | 18 | 18 | 18 | 18 | 18 | 18 | 18 | 18 | 18 |
| 3 | 6 | 9 | 13 | 14 | 18 | 18 | 18 | 18 | 18 | 18 | 18 | 18 | 18 | 18 | 18 | 18 |
| 4 | 7 | 11 | 13 | 18 | 18 | 18 | 18 | 18 | 18 | 18 | 18 | 18 | 18 | 18 | 18 | 18 |
| 5 | 7 | 13 | 13 | 18 | 18 | 18 | 18 | 18 | 18 | 18 | 18 | 18 | 18 | 18 | 18 | 18 |
| 6 | 8 | 13 | 14 | 18 | 18 | 18 | 18 | 18 | 18 | 18 | 18 | 18 | 18 | 18 | 18 | 18 |
| 7 | 8 | 14 | 18 | 18 | 18 | 18 | 18 | 18 | 18 | 18 | 18 | 18 | 18 | 18 | 18 | 18 |
| 8 | 9 | 14 | 18 | 18 | 18 | 18 | 18 | 18 | 18 | 18 | 18 | 18 | 18 | 18 | 18 | 18 |
| 9 | 9 | 14 | 18 | 18 | 18 | 18 | 18 | 18 | 18 | 18 | 18 | 18 | 18 | 18 | 18 | 18 |
| 10 | 11 | 18 | 18 | 18 | 18 | 18 | 18 | 18 | 18 | 18 | 18 | 18 | 18 | 18 | 18 | 18 |
| 11 | 11 | 18 | 18 | 18 | 18 | 18 | 18 | 18 | 18 | 18 | 18 | 18 | 18 | 18 | 18 | 18 |
| 12 | 11 | 18 | 18 | 18 | 18 | 18 | 18 | 18 | 18 | 18 | 18 | 18 | 18 | 18 | 18 | 18 |
| 13 | 11 | 18 | 18 | 18 | 18 | 18 | 18 | 18 | 18 | 18 | 18 | 18 | 18 | 18 | 18 | 18 |
| 14 | 13 | 18 | 18 | 18 | 18 | 18 | 18 | 18 | 18 | 18 | 18 | 18 | 18 | 18 | 18 | 18 |
| 15 | 13 | 18 | 18 | 18 | 18 | 18 | 18 | 18 | 18 | 18 | 18 | 18 | 18 | 18 | 18 | 18 |
| 16 | 13 | 18 | 18 | 18 | 18 | 18 | 18 | 18 | 18 | 18 | 18 | 18 | 18 | 18 | 18 | 18 |
| 17 | 13 | 18 | 18 | 18 | 18 | 18 | 18 | 18 | 18 | 18 | 18 | 18 | 18 | 18 | 18 | 18 |
| 18 | 14 | 18 | 18 | 18 | 18 | 18 | 18 | 18 | 18 | 18 | 18 | 18 | 18 | 18 | 18 | 18 |
| 19 | 14 | 18 | 18 | 18 | 18 | 18 | 18 | 18 | 18 | 18 | 18 | 18 | 18 | 18 | 18 | 18 |
| 20 | 14 | 18 | 18 | 18 | 18 | 18 | 18 | 18 | 18 | 18 | 18 | 18 | 18 | 18 | 18 | 18 |
| 21 | 14 | 18 | 18 | 18 | 18 | 18 | 18 | 18 | 18 | 18 | 18 | 18 | 18 | 18 | 18 | 18 |

Fig. 11

| | ① WEATHER FORECAST | | ② MOUNTAIN VILLAGE IN SWITZERLAND | | ③ TULIP GARDEN | |
|---|---|---|---|---|---|---|
| WEIGHTING | 1.0 | 0.5 | 1.0 | 0.5 | 1.0 | 0.5 |
| BIT-RATE ⟨Y⟩ | 27.04 Mbps | 17.59 Mbps | 35.55 Mbps | 27.02 Mbps | 36.09 Mbps | 27.69 Mbps |
| BIT-RATE ⟨R−Y⟩ | 9.31 Mbps | 5.78 Mbps | 9.82 Mbps | 6.32 Mbps | 10.90 Mbps | 7.06 Mbps |
| BIT-RATE ⟨B−Y⟩ | 9.36 Mbps | 6.31 Mbps | 11.51 Mbps | 7.74 Mbps | 12.16 Mbps | 8.03 Mbps |
| TOTAL BIT-RATE | 45.71 Mbps | 29.68 Mbps | 56.88 Mbps | 41.08 Mbps | 59.15 Mbps | 42.78 Mbps |

Fig. 12

| | ① WEATHER FORECAST | | ② MOUNTAIN VILLAGE IN SWITZERLAND | | ③ TULIP GARDEN | |
|---|---|---|---|---|---|---|
| WEIGHTING | 1.0 | 0.5 | 1.0 | 0.5 | 1.0 | 0.5 |
| BIT-RATE ⟨Y⟩ | 28.47 Mbps | 19.07 Mbps | 39.75 Mbps | 28.88 Mbps | 39.50 Mbps | 28.97 Mbps |
| BIT-RATE ⟨R-Y⟩ | 9.31 Mbps | 5.78 Mbps | 9.82 Mbps | 6.32 Mbps | 10.90 Mbps | 7.06 Mbps |
| BIT-RATE ⟨B-Y⟩ | 9.36 Mbps | 6.31 Mbps | 11.51 Mbps | 7.74 Mbps | 12.16 Mbps | 8.03 Mbps |
| TOTAL BIT-RATE | 47.13 Mbps | 31.16 Mbps | 61.08 Mbps | 42.94 Mbps | 62.56 Mbps | 44.06 Mbps |

NOTE : ① IS AT 9 BIT DCT

Fig. 13

| ORDER | 1 | 2 | 3 | 4 | 5 | 6 | 7 | 8 | 9 | 10 | 11 |
|---|---|---|---|---|---|---|---|---|---|---|---|
| NUMBER OF BIT | 3 | 3 | 4 | 5 | 5 | 6 | 6 | 6 | 7 | 7 | 7 |

| 12 | 13 | 14 | 15 | 16 | 17 | 18 | 19 | 20 | 21-28 |
|---|---|---|---|---|---|---|---|---|---|
| 7 | 8 | 8 | 8 | 8 | 9 | 9 | 9 | 9 | 11 |

| 29-44 | 45-60 | NOT LESS THAN 61 |
|---|---|---|
| 13 | 14 | 20(8 BIT DCT) OR 21(9 BIT DCT) |

Fig. 15

| | ① WEATHER FORECAST | | ② MOUNTAIN VILLAGE IN SWITZERLAND | | ③ TULIP GARDEN | |
|---|---|---|---|---|---|---|
| WEIGHTING | 1.0 | 0.5 | 1.0 | 0.5 | 1.0 | 0.5 |
| BIT-RATE (Y) | 26.20 Mbps | 17.45 Mbps | 35.29 Mbps | 26.94 Mbps | 35.94 Mbps | 27.58 Mbps |
| BIT-RATE (R-Y) | 8.90 Mbps | 5.69 Mbps | 9.79 Mbps | 6.20 Mbps | 10.89 Mbps | 7.02 Mbps |
| BIT-RATE (B-Y) | 8.83 Mbps | 6.13 Mbps | 11.42 Mbps | 7.69 Mbps | 12.15 Mbps | 7.98 Mbps |
| TOTAL BIT-RATE | 43.92 Mbps | 29.27 Mbps | 56.50 Mbps | 40.84 Mbps | 58.98 Mbps | 42.57 Mbps |

5,513,008

VARIABLE LENGTH CODING METHOD USING DIFFERENT BIT ASSIGNING SCHEMES FOR LUMINANCE AND CHROMINANCE SIGNALS

This application is a continuation, of application Ser. No. 07/665,581 filed on Mar. 5, 1991, now abandoned.

BACKGROUND OF THE INVENTION

1. Field of the Invention

This invention relates to a variable length coding method intended to assign a different number of coding bits in accordance with the information content of a sample in converting an analog signal such as a television signal, etc. to a digital signal.

2. Description of Related Art

Most of the recent domestic digital video cassette recorders (referred to as a DVCR hereinafter) which are under development use a tape of 8 mm width. FIG. 1 illustrates a recording format of the DVCR conceivable from the present magnetic recording technique. Assuming that the length of a video track 21 of a tape 1 is approximately 62.4 mm, the width thereof is 6 μm and the surface recording density is 2.2 μm²/bit, for example, in the case of recording using four recording heads while the drum is rotated at 3600 rpm, the recording bit-rate is approximately 41.27 Mbps. On the other hand, if a digital video signal is a signal of 4:2:2 component in compliance with CCIR, the recording bit-rate is about 216 Mbps. Therefore, it is considerably difficult to record the signal in real time on the tape of 8 mm width as it is inputted, and it becomes necessary to compress the inputted signal.

Meanwhile, a variable length coding method is considered as one method for compressing a signal. According to this coding method, when the analog signal is converted to a digital signal, a large number of coding bits are assigned to a sample having a large volume of information content, whereas a small number of coding bits is assigned to a sample having a small volume of information content. That is, a different number of coding bits is assigned corresponding to the roll,me of the information content. For example, an argument "ON ADAPTIVE DCT CODING TECHNIQUES FOR DIGITAL VIDEO RECORDING" (P.H.N.DE WITH and S.M.C. BORGERS, Philips) is revealed on IERE Proc. 7th Int. Conference on VIDEO, AUDIO and DATA RECORDING (Mar. 1988). An example of the variable length coding method is discussed therein, which reads as follows:

Each block of samples of size 8×8, for example, are considered, and correspondingly, the coefficients remaining after cosine transformation are denoted as F(u,v), where $0 \leq u, v \leq 7$, The absolute address R of a coefficient is defined as the ranking number determined by the scanning function S of the coefficients (FIG. 2), thus R=S(u,v), 25 where $0 \leq R \leq 63$. The coefficients are scanned before the coding starts and l coefficients (with R>0) to be of non-zero amplitude are assumed. Correspondingly, a coefficient is uniquely determined by its amplitude F and its address R (ranking number after scanning).

Step 1 (full sort): Select coefficients with R>0 and order them in an amplitude stack. For the k-th selected coefficient $F_k$ the following holds:

$$|F_k(R_k)| \geq |F_{k+1}(R_{k+1})|, \ldots,$$

$$|F_k(R_k)| > 0 \ (1 \leq k \leq l)$$

The corresponding addresses $R_k$ are stored in an a stack. If $|F_j(R_j)|=|F_k(R_k)|$ and $R_j<R_k$, then j<k.

Step 2 ( construct-difference signal ): Calculate the amplitude differences $D_k(R_k)$ defined by:

$$D_k(R_k)=|F_{k-1}R_{(k-1)}|-|F_k(R_k)|, \ 2 \leq k \leq l$$

$$D_1(R_1)=|F_1(R_1)|, \ k=1$$

This difference signal $D_k$ is a non-negative sequence for each block. The original amplitude signs sign($F_k$) are encoded separately. There are no changes in the address stack during this step.

Step 3 (address calculation): Recalculate from each address $R_k$ an address $T_k$ according to:

$$T_k=R_k-N_k(1,R_k), \ D_k \geq 0$$

$$T_k=R_k-R_{k-1}-N_k(R_{k-1},R_k), \ D_k=0$$

where $N_k(R_1, R_2)$ refers to the number of (previously encoded) coefficients Fj, $1 \leq j \leq k-1$ having $R_1 \leq R < R_2$. The stack with amplitude differences is not changed during this step.

Step 4 (bit mapping): Coding of the sequence $D_k$ and the corresponding addresses $T_k$ for $1 \leq k \leq l$ is performed here with two variable-length code tables, viz. VLC$_D(D_k)$ and VLC$_T(T_k)$. Furthermore, the DC coefficient F(0) is always transmitted as well as the sign of each selected coefficient $F_k$. An example of a list of Huffman codewords for amplitudes and addresses is given in FIG. 3.

The DC coefficient F(0) is coded with some codeword C. The coding terminates with an EOB (End of Block) codeword since the number of coded coefficients may vary from block to block. In addition, the efficiency can be improved slightly by coding only the first coefficient with $|F_k|=1$ and skipping all the codewords from VLC$_D$ related to equal-valued coefficients.

Since the conventional variable length coding method is performed as explained hereinabove, even if samples holding much information content or less information content in one block, the signals are successively coded one by one, regardless of the fact of the concentration, according to the method. As a result, the amount of data is not constant relative to the capacity of a recording medium, requiring some kind of manipulation such as suppression of the data which causes degradation of the image quality in reproducing the data.

SUMMARY OF THE INVENTION

An object of this invention is to provide a variable length coding method capable of averaging the information content in each block after coding even if the information content of the samples in the block is varied.

Another object of this invention is to provide a variable length coding method capable of preventing degradation of the data in recording and reproducing the same.

A further object of this invention is to provide a variable length coding method, whereby the data related to assigning method of coding bits is added to the coded digital signal, thereby preventing deterioration of the error correction capability or increase of the transmission bit-rate.

According to a variable length coding method of this invention, a different number of coding bits is assigned in accordance with the information content a sample holds when an analog signal such as a television signal, etc. is coded to a digital signal. The assigning method of coding bits is made different For the kind of the analog signal, for example, between a luminance signal and a chrominance signal. Moreover, a plurality of assigning methods of coding bits are determined, so that an optimum assigning method is selected corresponding to the contents of the original signal. The data related to the plurality of assigning methods of coding bits is added to the coded digital signal for recording onto a recording medium.

The above and Further objects and features of the invention will more fully be apparent from the following detailed description with accompanying drawings.

BRIEF DESCRIPTION OF THE DRAWINGS

FIG. 3 is a list of Huffman codewords;

FIGS. 5, 6, 7 and 8 are bit maps of the numbers of coding bits;

FIG. 11 is a table showing the calculating result of transmission bit-rates when a different bit map is used for a luminance signal from that for a chrominance signal:

FIG. 12 is a table showing the calculating result of transmission bit-rates when the same bit map is used for a luminance signal as that for a chrominance signal;

FIG. 13 is a table of the numbers of coding bits to be assigned;

FIG. 15 is a table of the calculating result of transmission bit-rates when the numbers of coding bits of FIG. 13 are assigned;

DESCRIPTION OF THE PREFERRED EMBODIMENTS

A variable length coding method according to one preferred embodiment of this invention will be discussed in detail hereinbelow with reference to the accompanying drawings.

It is to be noted here that the following description of the embodiment is directed to the case where a television signal in NTSC system is converted to a digital signal and recorded on a tape of a DVCR.

Figure 4A:
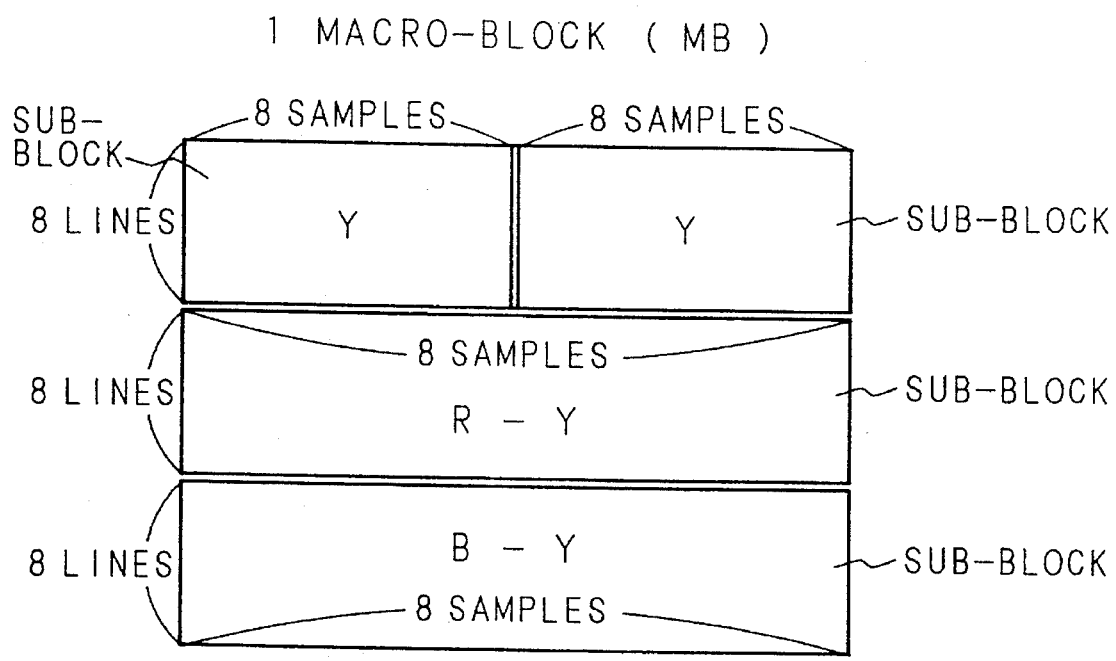
FIG. 4 (a) and 4 (b) are diagrams showing the structure of a macro-block and a field, respectively.
Figure 4B:
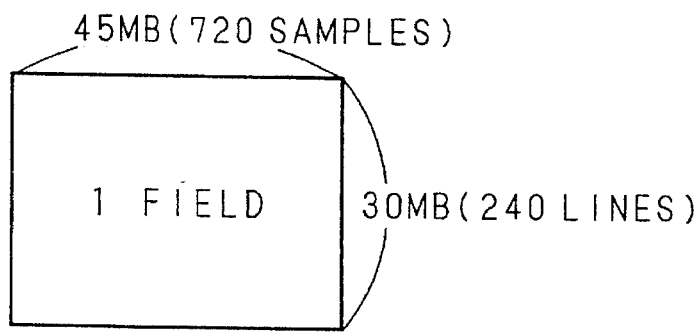

The structure of a macro-block (MB) which is a coding unit according to the present embodiment is illustrated in FIG. 4 (a). Each sub-block of a luminance signal (Y) and chrominance signals (R-Y) and (B-Y) consists of 8 samples × 8 lines. There are two sub-blocks of Y and each one block of R-Y and B-Y in one MB. As indicated in FIG. 4(a), the sub-block of R-Y or B-Y is physically equal in size to two sub-blocks of Y. FIG. 4(b) indicates the structure of a field of a video signal which field consists of 720 samples ×240 lines, i.e., 1350 MB according to the present embodiment.

In coding, a digital signal is converted by the known DCT (Discrete Cosine Transform) method. Supposing that the inputted image signal in each block is expressed by x(i,j) ( i ,j=0, 1 , . . . , 7) , DCT on 8 picture elements in horizontal direction is performed to the image signal based on the equations as below;

$$f(0, j) = \frac{1}{2\sqrt{2}} \sum_{i=0}^{7} x(i, j)$$

$$f(m, j) = \frac{1}{2} \sum_{i=0}^{7} x(i, j) \cos \frac{(2i + 1)m\pi}{16}$$

$(m = 1, 2, \ldots, 7)$ $(j = 0, 1, \ldots, 7)$

Thereafter, DCT on 8 picture elements in vertical direction is performed on the transformed image signal f(0,j) and f(m,j) as indicated below, whereby the image signal is expressed by coefficients F(m,n) (m, n=0, 1, . . . , 7);

$$F(m, 0) = \frac{1}{2\sqrt{2}} \sum_{j=0}^{7} f(m, j)$$

$$F(m, n) = \frac{1}{2} \sum_{j=0}^{7} f(m, j) \cos \frac{(2j + 1)n\pi}{16}$$

$(n = 1, 2, \ldots, 7)$ $(m = 0, 1, \ldots, 7)$

Figure 2:
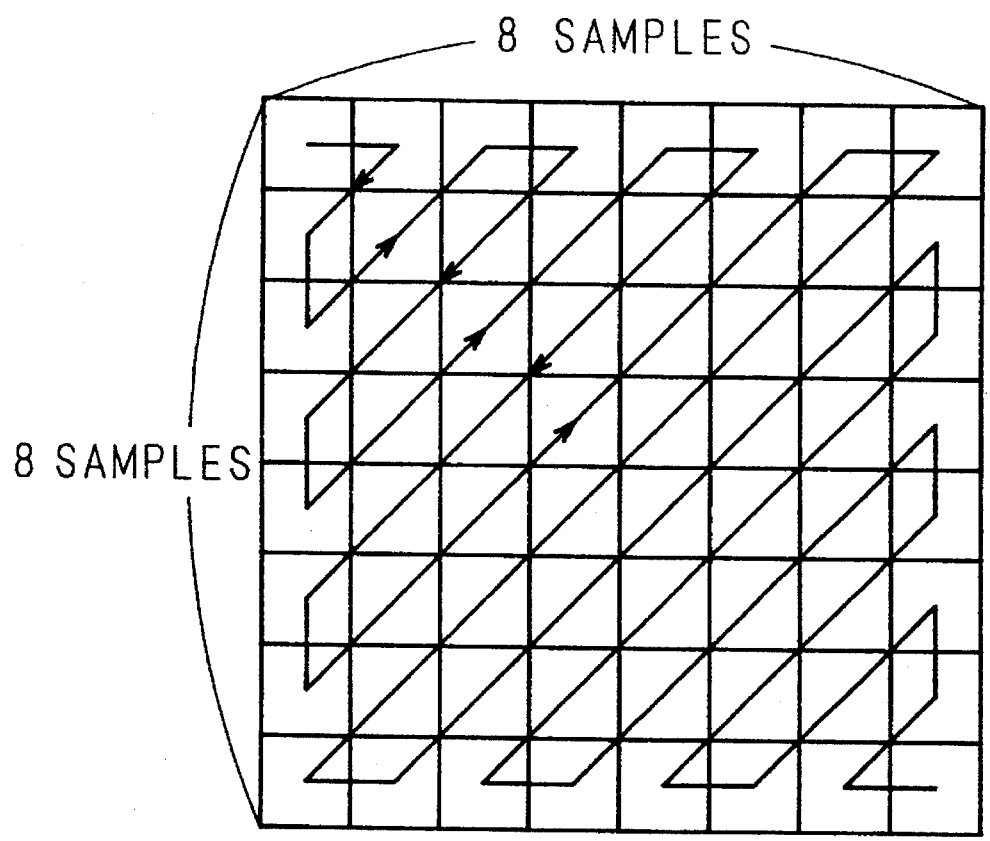
FIG. 2 is a diagram showing the scanning pattern of a signal.

The obtained coefficients are coded, when each sub-block is scanned by the function S called as zigzag scanning, similar to that shown in FIG. 2. In FIG. 2, the left-upper coefficient is called the DC one, and the other coefficients are called the AC ones. The DC coefficient is coded with 8 bits, while AC coefficients are coded through run-length coding, wherein R is a number with consecutive coefficients of zero value and S is an absolute value of the coefficient not being zero, and Huffman codeword is assigned to each coefficient corresponding to these R and S. When scanning by the function S, for example, if a coefficient A of 1 value follows two consecutive coefficients having zero values, the coefficient A has the data R=2 and S=1.

In the present embodiment, an assigning method of coding bits in the sub-block of the luminance signal (Y) is made different from that in the sub-blocks of the chrominance signals (R-Y) and (B-Y).

Figure 5:
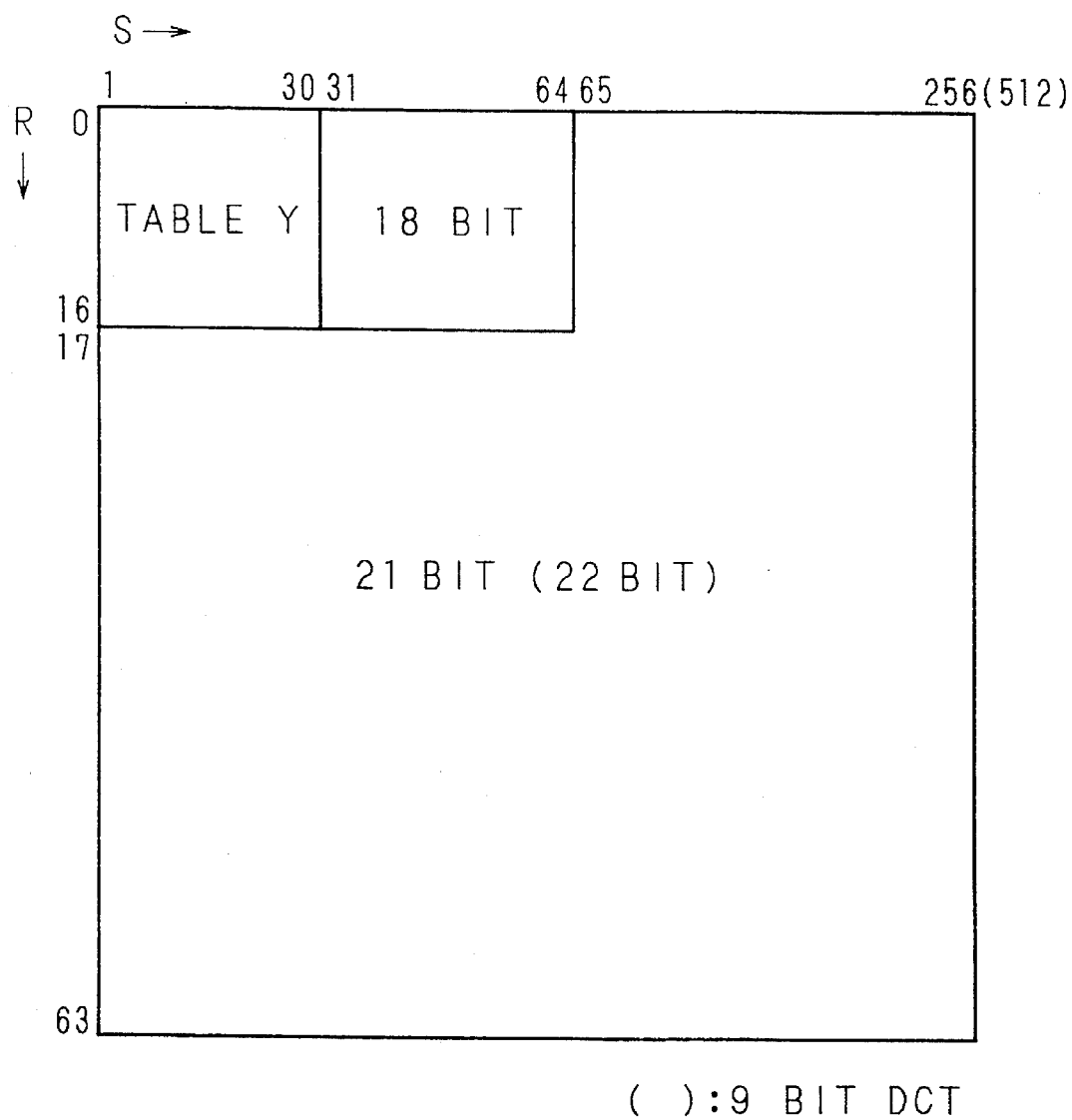
Figure 7:
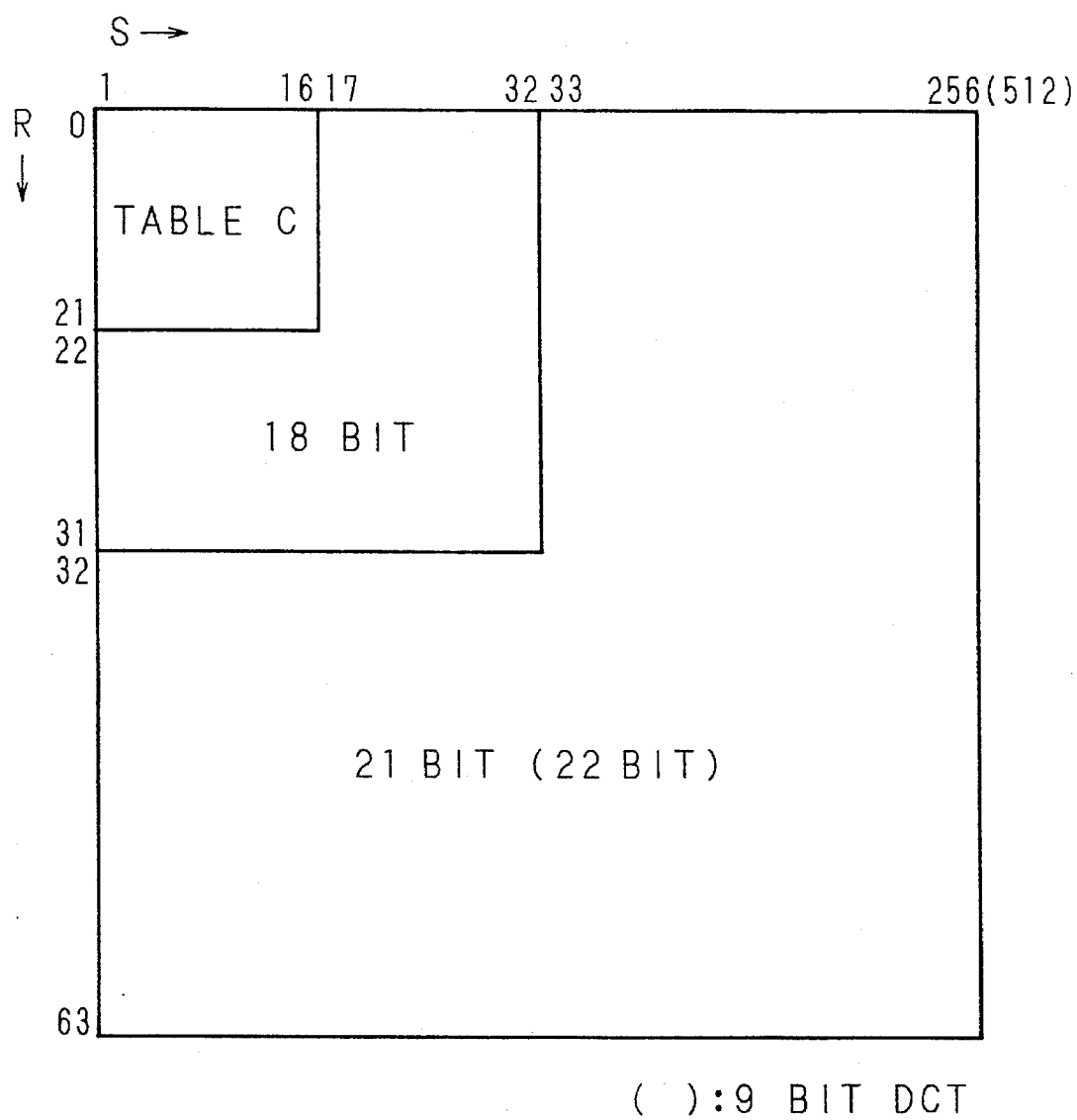

FIG. 5 shows a bit map for use in the assigning method of coding bits of the luminance signal. Since the DCT is carried out with 8 bits or 9 bits depending on the kind of the image, the number of bits is more or less varied. Table Y in FIG. 5 is shown in FIG. 6. It is found out from the map of FIG. 6 that the aforementioned coefficient A which has the data R=2 and S=1 is assigned with 6 as the number of coding bits. Similarly, FIG. 7 shows a bit map for use in the assigning method of coding bits of the chrominance signals and Table C in FIG. 7 is shown in FIG. 8.

Figure 9:
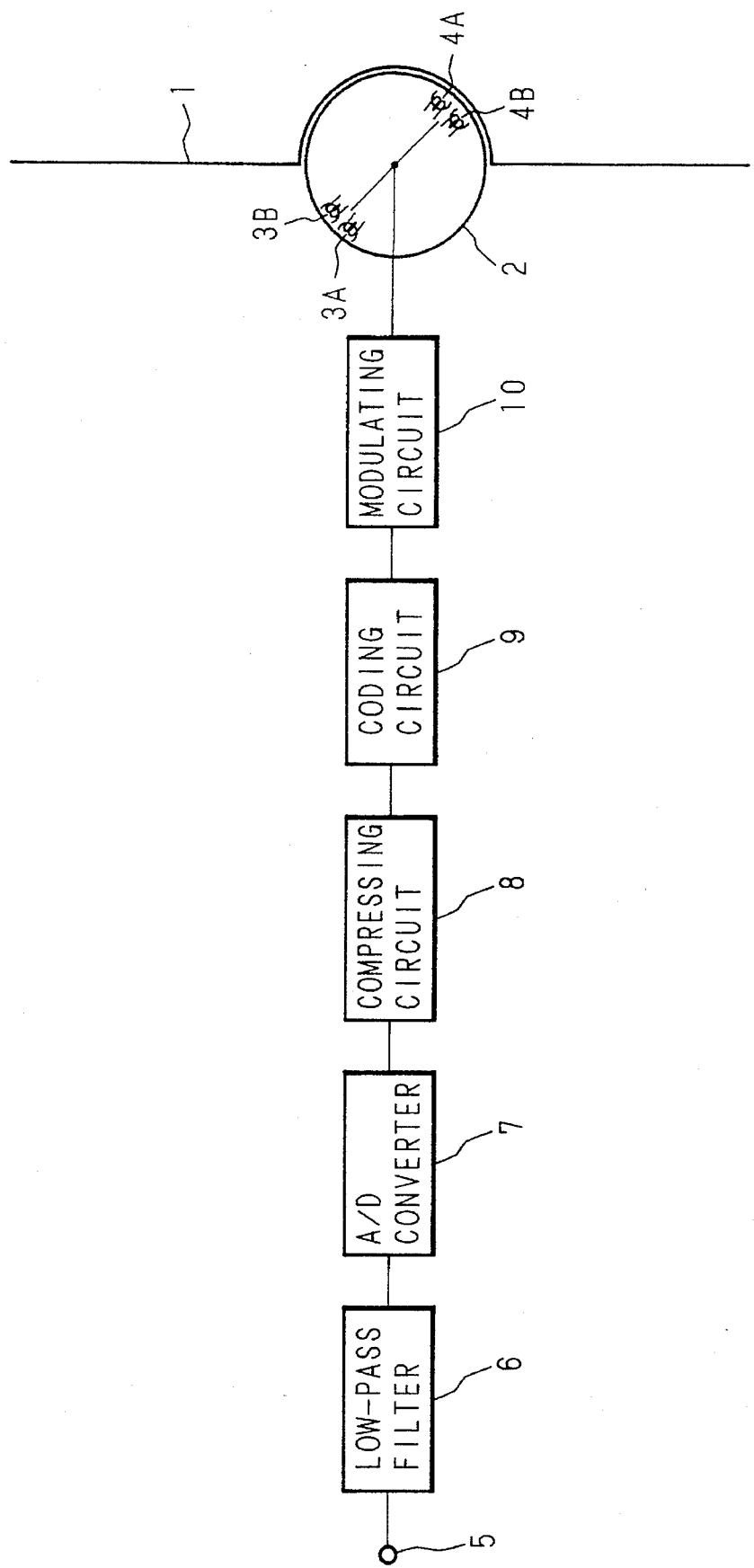
FIG. 9 is a block diagram showing the structure at the recording side of a DVCR to which is applied a variable length coding method of this invention.

The structure at the recording side of a DVCR for embodying this invention is illustrated in FIG. 9, wherein numerals 1 and 2 represent a tape and a rotary drum, respectively. An analog video signal inputted from an input terminal 5 is converted to a digital signal at an A/D converter 7 through a low-pass filter 6. An output from the A/D converter 7 is processed by DCT treatment in a compressing circuit 8 and then subjected to a variable length coding and a correction coding and the like in a coding circuit 9. After the coded signal is modulated in a modulating circuit 10, it is recorded on the tape 1 by recording heads 3A, 3B, 4A and 4B.

Figure 10:
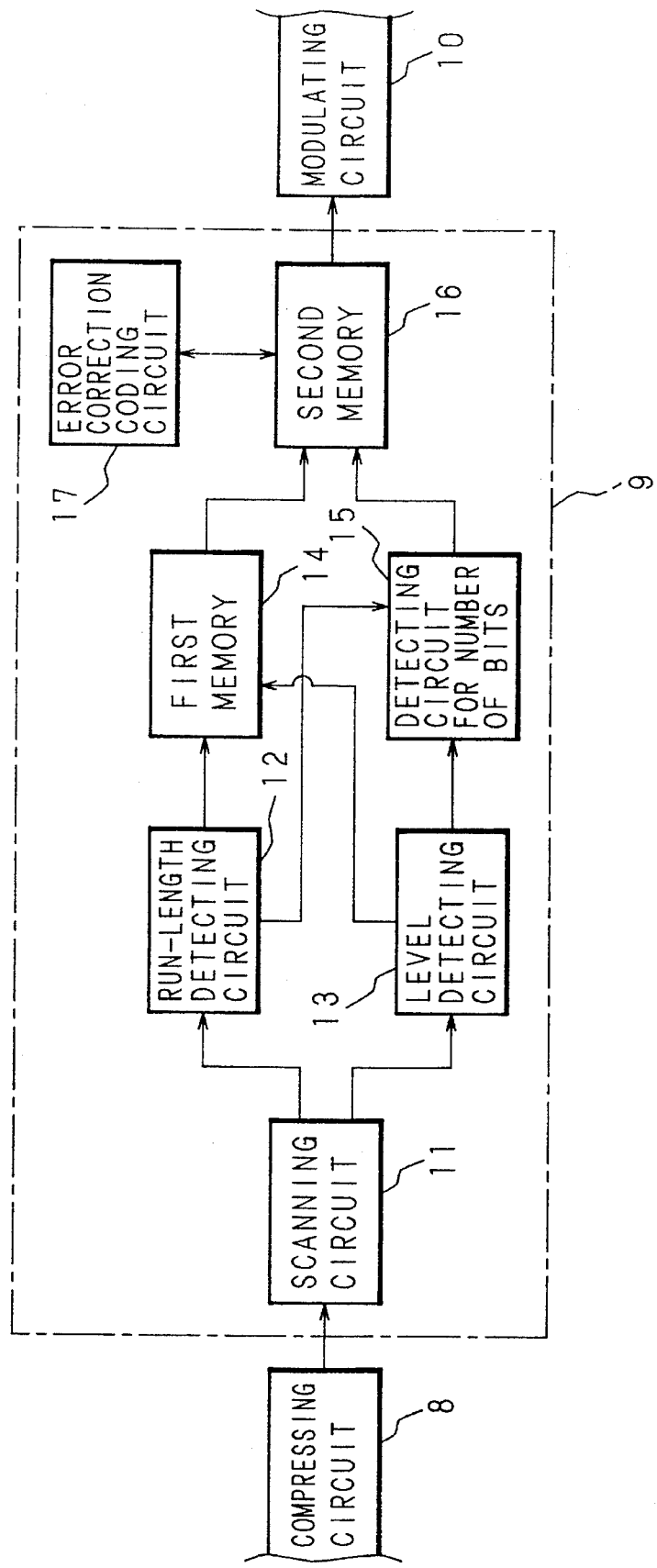
FIG. 10 is a block diagram showing the structure of a coding circuit of FIG. 9.

FIG. 10 is a block diagram showing the inner structure of the coding circuit 9. The video signal after the DCT is scanned by the function S in a scanning circuit 11. R and S of each coefficient are determined in a run-length detecting circuit 12 and a level detecting circuit 13. Each coefficient is inputted to a first memory 14 by using each binary code in combination of R and S as an address. Codes corresponding to respective addresses are written in the first memory 14 beforehand.

In response to the binary code, a code is outputted from the first memory 14. Since the largest number of bits of the code outputted at this occasion is 21 (or 22), the obtained values of R and S are inputted to a detecting circuit 15 for number of bits so as to determine the effective number of bits. After the effective number of bits is determined in the circuit 15, the code is written into a second memory 16, corrected in an error correction coding circuit 17 and inputted to the modulating circuit 10.

Hereinbelow, it will be compared how much the amount of data is reduced between the case where all the signals are coded according to only one coding method as in the prior art and the case where the signals are coded by changing the coding method corresponding to the tendency of the signals as in the present embodiment. Coding is performed for standard image signals and the transmission bit-rate is calculated. It is to be noted here that an image used here is three kinds of standard static images, namely, ① weather forecast, ② mountain village in Switzerland and ③ tulip garden, based on the ITE chart of Television Institution.

In the first place, the calculating result is compared between the following two cases:

A: The bit maps of FIGS. 5 and 6 are used for the luminance signal (Y) and the bit maps of FIGS. 7 and 8 are used for the chrominance signals (R-Y) and (B-Y);

B: The bit maps of FIGS. 7 and 8 are used for both the luminance signal and the chrominance signals.

The calculating result in each of the above cases A and B is tabulated in FIGS. 11 and 12, respectively.

As is clear from the comparison between FIGS. 11 and 12, the transmission bit-rate of the luminance signal is reduced more in any case of A than B. Accordingly, it is more effective to reduce the transmission bit-rate to change the bit maps between the luminance signal and chrominance signals in accordance with the tendency of the signals, rather than to apply only one kind of the bit map to all the signals as in the conventional method.

This method may be further developed to form a bit map fit for every different field or every different image. That is, combinations P(R,S) of R and S are formed, and the existing probability of the coefficient for each P(R,S) to the total number of coefficients in one image field is obtained, thereby assigning coding bits from a smaller one in the order of the probability from a larger one.

FIG. 13 shows the coding bits assigned according to the above-described developed method.

Figure 14:
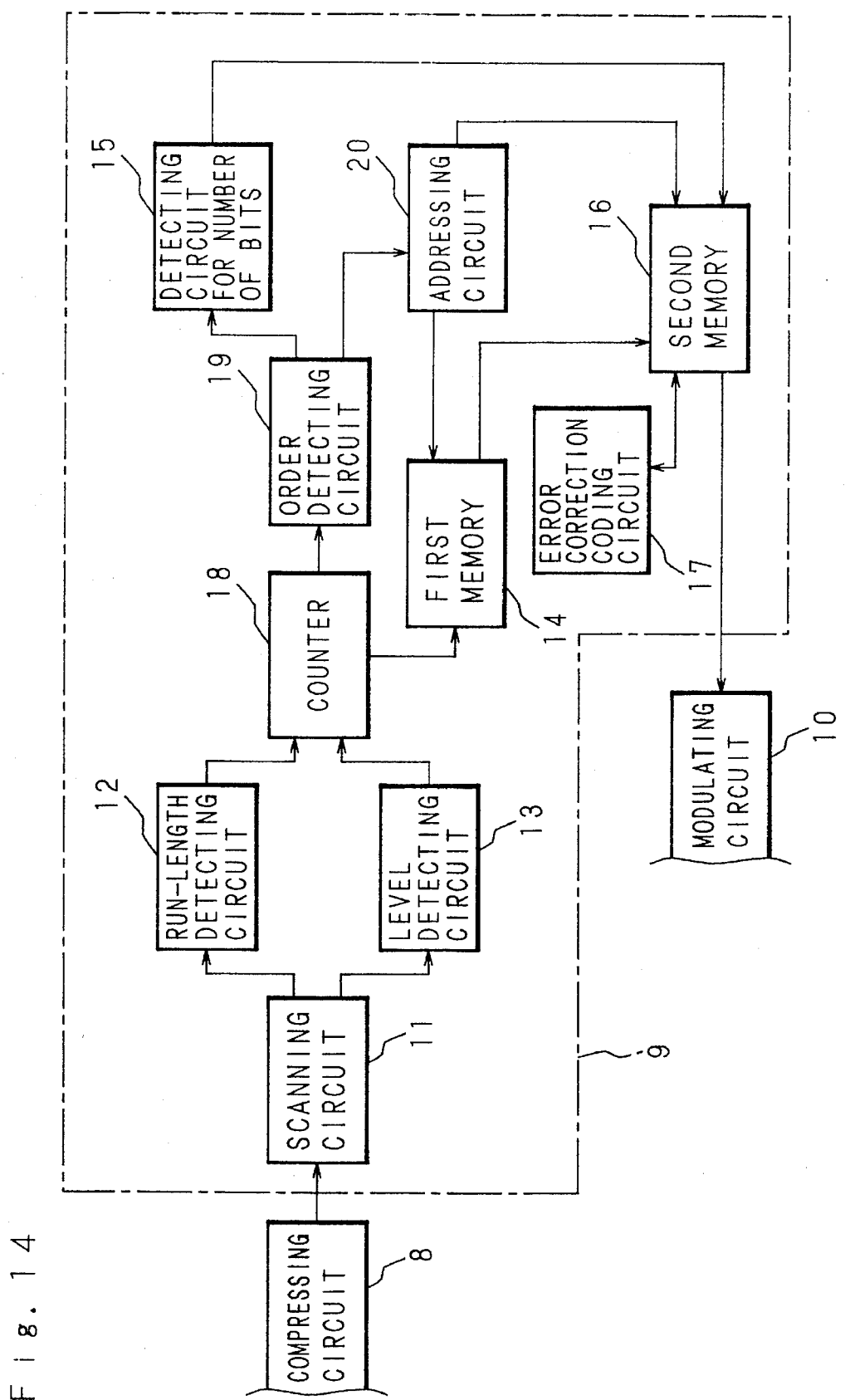
FIG. 14 is a block diagram showing another structure of the coding circuit of FIG. 9.

The structure of the coding circuit 9 for practicing the developed method is indicated in FIG. 14. When the run length (R) and the value of the coefficient (S) are determined in the similar manner as in FIG. 10, the value of the coefficient is counted one to the corresponding P(R,S) by a counter 18. At the same time, the coefficient is once stored in the first memory 14. After the coefficients of one field are completely counted, the existing probability of the coefficient is obtained by an order detecting circuit 19, and a ranking number form the first to 60th is assigned to each P(R,S) in the order from the one having the coefficient of a larger one. Then, the number of coding bits is given by the detecting circuit 15 and at the same time, the address of the memory is controlled by an addressing circuit 20. Signals in the first memory 14 are sequentially read out from the first of the ranking number to be written in the second memory 16. The subsequent process goes the same as in FIG. 10

The calculating result by this method is tabulated in FIG. 15, which makes it clear that the transmission bit-rate is much more reduced than in the case A of FIG. 11, that is, the coding method of this invention is remarkably improved as compared with the conventional method.

Now, it will be explained how to record the signal assigned with the number of coding bits in accordance with the above bit map on the tape 1.

As shown in FIGS. 5 and 6 (or FIGS. 7 and 8), there are 60 combinations of R and S in total in the bit map wherein 3-14 bits are assigned. By the other combinations of R and S, either 18 bits or 21 (22) bits are assigned, i.e, the number of coding bits assigned is virtually constant. Therefore, the following description is made on the assumption to record the data related to the 60 combinations (R,S) on the tape 1.

The combinations (R,S) are ranked in the order of the number of coding bits from a smaller one. Taking the case of FIGS. 5 and 6 by way of example, the first rank is (0,1), the second rank (0,2), the third rank (1,1), . . . . The rank of the combination and a binary code corresponding to the subject combination (R,S) are written in the first memory 14 as an address. In the meantime, the combination (R,S) is expressed by a ten-bit code, each of R and S by five bits. For example, the combination (0,1) is defined by "0000000001". This code has 10×60=600 (bits)=75 (bytes) for one field, and accordingly approximately 150 bytes for one field including those of the chrominance signals.

Figure 1:
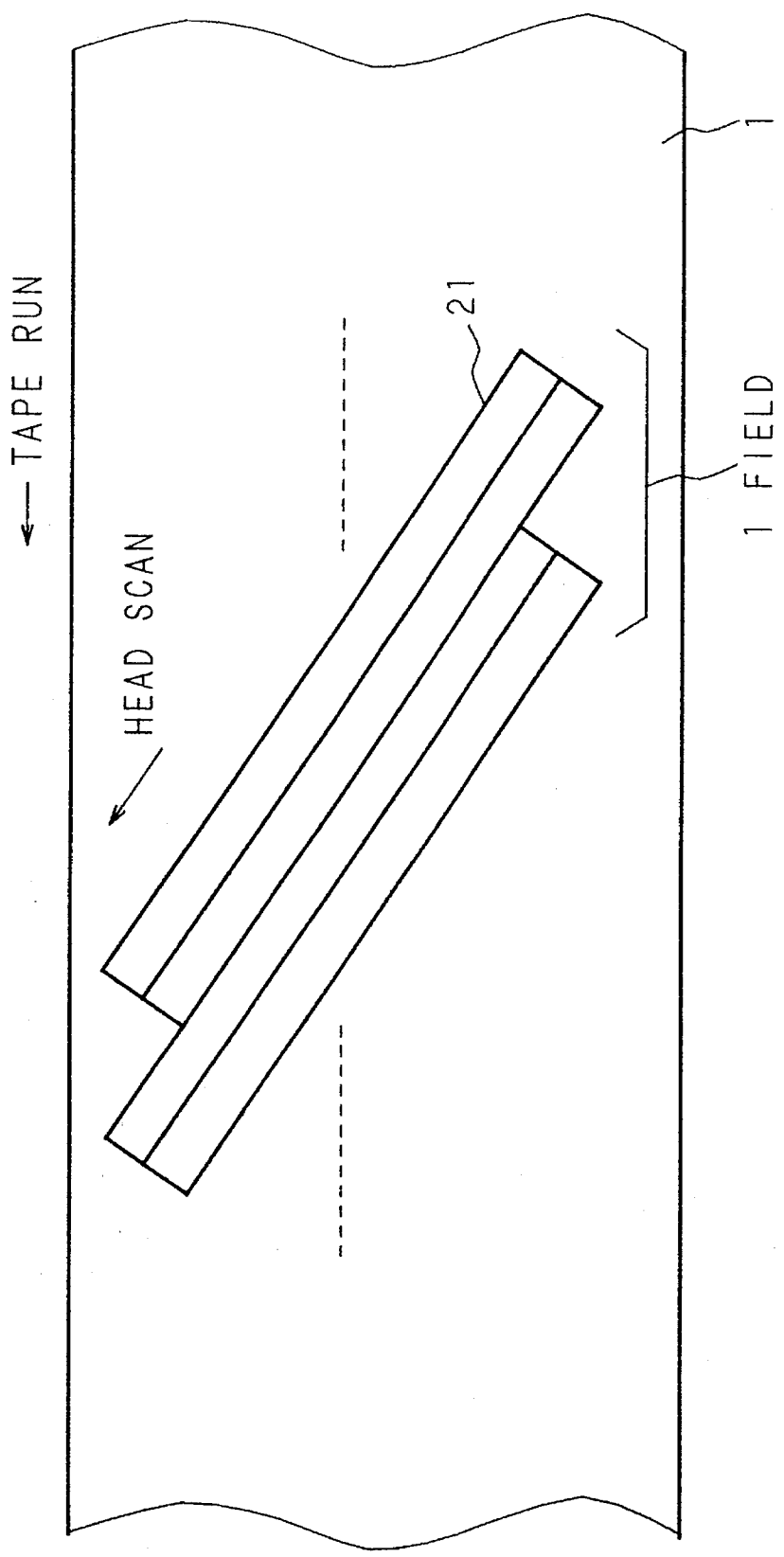
FIG. 1 is a diagram showing the pattern of a track of a tape for a DVCR.
Figure 16:
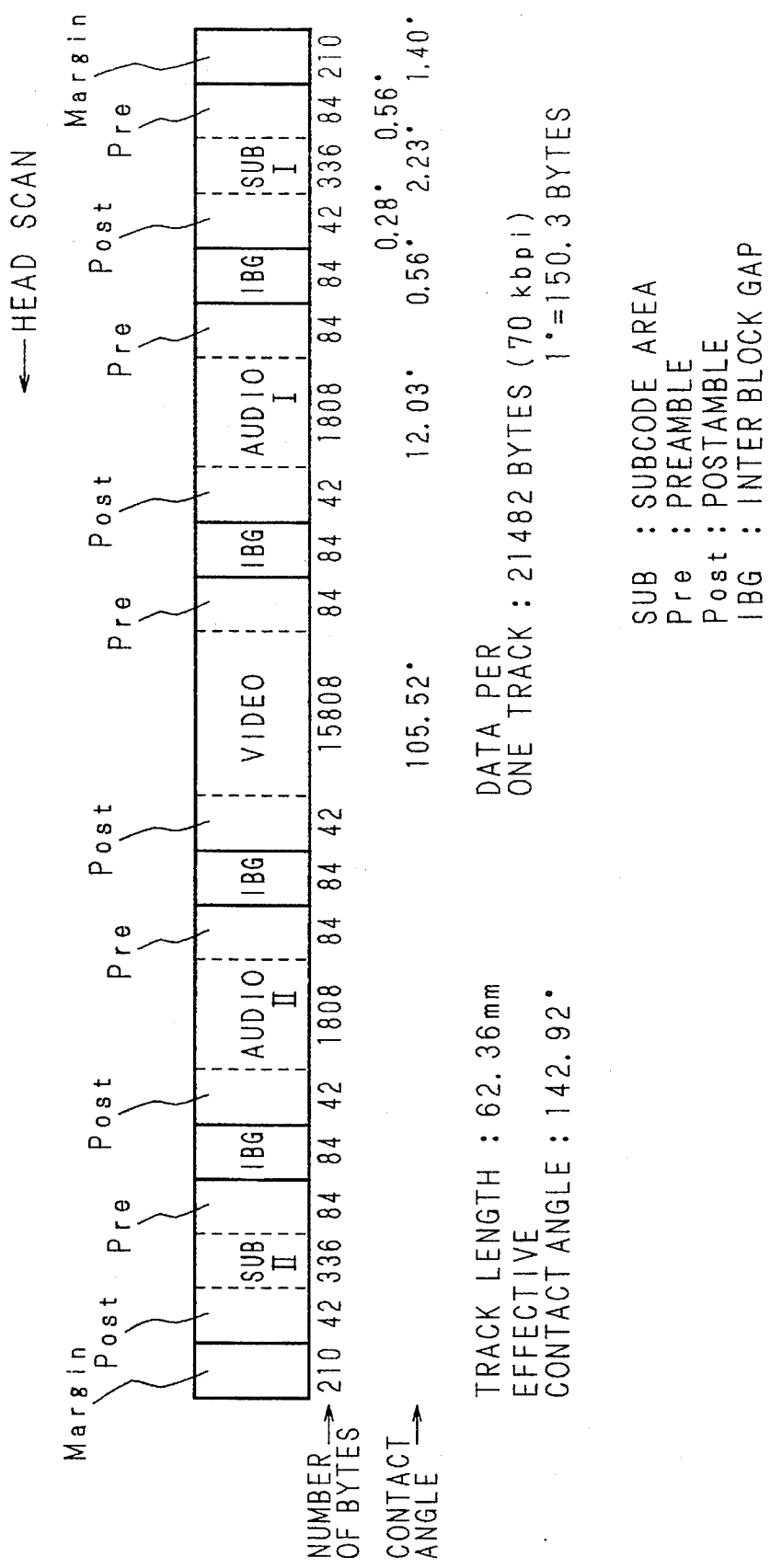
FIG. 16 is a diagram showing an example of the structure within one track of a tape.

As compared with the recording format shown in FIG. 1, since the linear recording density is about 70 kbpi, the amount of data recordable in one track is about 21500 bytes. An example of the inner structure of the track is shown in FIG. 16. Supposing that 4-5% or so of the video signals are assigned to a subcode area, the amount of data recordable in one subcode area is 336 bytes, which is enough to record the data related to the combination (R,S). Since the inner structure of the-track is not restricted to that of FIG. 16, For example, the data related to the combination (R,S) may be recorded in a portion of ID signals in a different structure.

Furthermore, the data corresponding to the bit map may be superimposed with an error correction code for being recorded on the tape 1. The superimposion of codes is disclosed, e.g., in "New Classes of Binary Codes Constructed on the Basis of Concatenated Codes and Product Codes" (M. Kasahara, et al., IEEE Transactions on Information Theory, Vol. IT-22, No. 4, Jul. 1976) or the like.

Figure 17A:
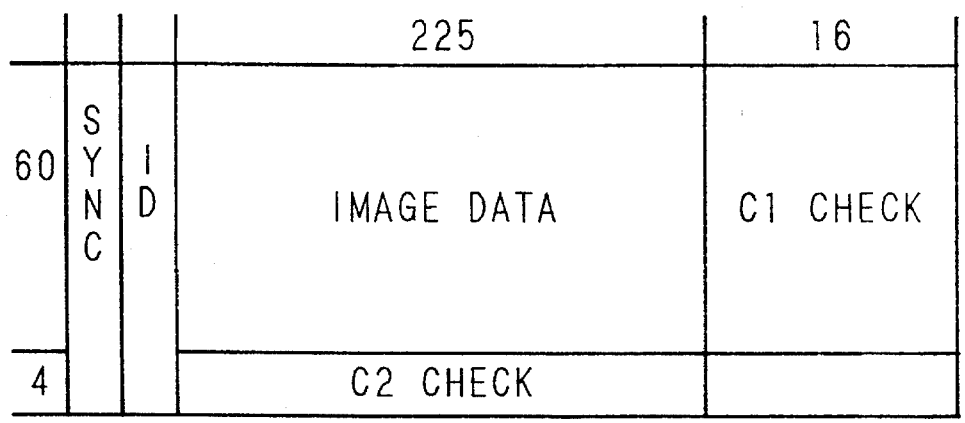
FIG. 17(a), 17(b) and 17(c) are diagrams showing the structure of an error correction code.
Figure 17B:
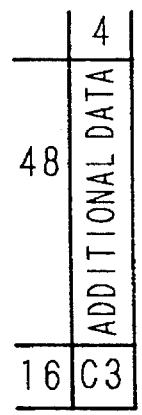
Figure 17C:
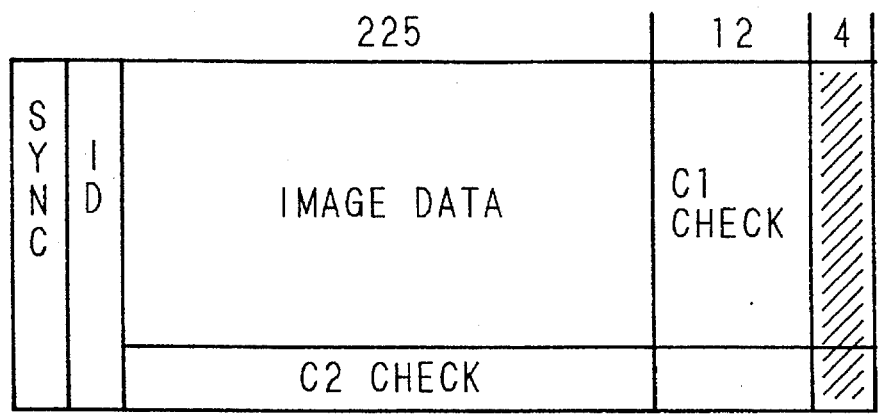

By way of example, if the recording bit-rate of the image after it is compressed is about 25 Mbps and one field is constructed of two tracks, the amount of data per one track is about 27,000 bytes. FIG. 17(a) shows an example of the structure of codes in the track, wherein one track is divided into two blocks, each block constituted of a product code of (241,225,17) RS code (C1 code) and (64,60,5) RS code (C2 code). On the other hand, FIGS. 17(b) and 17(c) show the structure of codes, wherein besides the structure of FIG. 17(a), (64,48,17) RS code is constructed of four code-words and superimposed with a check code portion of the C1 code. C1 code and C3 code are called also as an LDC (Long Distance Code) and employed in an optical disc apparatus, etc., realizing an error correction LSI.

The transmission of data is carried out in a direction of the C1 code. The efficiency can be strengthened to a burst error if two blocks in one track are interleaved. The presence or absence of the superimposed C3 code is determined by an ID number. Without the superimposed C3 code, 8 error corrections are conducted by the C1 code. If the C3 code is superimposed, the superimposed portion is regarded as an erasure, so that four erasures and six error corrections are carried out by the C1 code. The error in the position of the erasure has the pattern (C3 code data+true error), so that the C3 code can be separated. In the case where correction is impossible in decoding the C1 code, a flag is erected for the codeword, with the erasure correction performed by the C2 and C3 codes. Only the C1 code is used for correction during the high sped search or the like.

Supposing that the data related to the 60 combinations (R,S) is superimposed for recording, when the combination (R,S) is expressed by a code of 10 bits, as described earlier, the code is 75 bytes for one field, resulting in about 150 bytes per one field including those of the chrominance signals. In contrast, since the area of the superimposing code is 48×4=192 bytes as shown in FIG. 17(b), the binary code of (R,S) of one field can be sufficiently recorded.

Although the superimposing code is so constructed as shown in FIG. 17 in the present embodiment, the structure thereof is not limited, but be formed in any arbitrary fashion.

The bit map is changed between the luminance signal and color signals, and an optimum bit map is selected for every unit of a field in the foregoing embodiment. However, the bit map may be changed in the other manners.

Furthermore, the sub-block and macro-block of the signal may be formed in a different structure from that shown in FIG. 4(a). Also the structure of one field may be changed from that of FIG. 4 (b).

According to the foregoing embodiment, the variable length coding system is applied to the case where a television signal is recorded on the DVCR. The same effect can be achieved even if the system is applied to the other signals or apparatuses.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A variable length coding method for coding an analog signal containing a first analog signal and a second analog signal, whose frequency components are different, to a digital signal, comprising the steps of:
  (a) obtaining a first block having a predetermined number of sample signals and a first length in a horizontal direction, by sampling said first analog signal at a first sampling frequency;
  (b) obtaining a second block having the predetermined number of sample signals and a second length in the horizontal direction, larger than said first length, by sampling said second analog signal at a second sampling frequency;
  (c) coding said first block using a first bit map table; and
  (d) coding said second block using a second bit map table, different from said first bit map table, wherein a greater number of bits are assigned to said second block as a result of said second length.

2. The variable length coding method of claim 1, wherein said first analog signal is a video luminance signal and said second analog signal is a video chrominance signal.

3. The variable length coding method of claim 1, wherein said step (c) includes,
  (c)(1) performing a discrete cosine transform (DCT) for said first block and generating coefficients;
  (c)(2) scanning said coefficients in a predetermined order and obtaining a value, R indicating a number of consecutive zero coefficients and a value, S indicating an absolute value of each coefficient; and
  (c)(3) coding each coefficient based on the combination of said R and S using said first bit map table.

4. The variable length coding method of claim 1, wherein said step (d) includes,
  (d)(1) performing a discrete cosine transfer (DCT) for said second block and obtaining coefficients;
  (d)(2) scanning said coefficients in a predetermined order and obtaining a value, R indicating a number of consecutive zero coefficients and a value S indicating an absolute value of each coefficient; and
  (d)(3) coding each coefficient based on the combination said R and S using said second bit map table.

5. A variable length coding method for coding a television signal containing a luminance signal and two kinds of chrominance signal to a digital signal, comprising:
  (a) obtaining a first sub-block having a predetermined number of sample signals and a first length in a horizontal direction, by sampling said luminance signal at a predetermined sampling frequency;
  (b) obtaining two second sub-blocks each of which has said predetermined number of sample signals and a second length in the horizontal direction, larger than said first length, by sampling said two kinds of chrominance signal at half of said predetermined sampling frequency;
  (c) composing a macro-block by combining said first sub-block and two second sub-blocks;
  (d) coding said first sub-block using a first bit map table; and
  (f) coding said second sub-blocks using a second bit map table, different from said first bit map table, wherein a greater number of bits are assigned to said second sub-block as a result of said second length.

6. The variable length coding method of claim 5, wherein said first sub-block and said second sub-blocks have sample signals of 8 samples per 1 line ×8 lines.

7. The variable length coming method of claim 5, wherein said step (e) includes,
  (e)(1) performing a discrete cosine transfer (DCT) for said first sub-block and obtaining coefficients;
  (e)(2) scanning said coefficients in a predetermined order and obtaining a value, R indicating a number of consecutive zero coefficients and a value S indicating an absolute value of each coefficient; and
  (e)(e) coding each coefficient based on the combination of said R and S using said first bit map table.

8. The variable length coding method of claim 5, wherein said step (f) includes,
  (f)(1)performing a discrete cosine transform (DCT) for said second sub-blocks and obtaining coefficients;
  (f)(2) scanning said coefficients in a predetermined order and obtaining a value R indicating a number of consecutive zero coefficients and a value S indicating an absolute value of each coefficient; and
  (f)(2) coding each coefficient based on the combination of said R and S using said second bit map table.

9. A variable length coding method for coding an analog signal to a digital signal, comprising the steps of:
(a) obtaining a block having a predetermined number of sample signals by sampling said analog signal at a predetermined sampling frequency;
(b) performing a discrete cosine transform (DCT) for said block and obtaining coefficients;
(c) scanning said coefficients in a predetermined order and obtaining a value R indicating a number of consecutive zero coefficients and a value S indicating an absolute value of each coefficient;
(d) computing an existing probability of the combination of said R and S;
(e) determining a number of coding bits to be assigned to each combination of said R and S based on the existing probability; and
(f) coding each coefficient according to the determined number of coding bits.

10. The variable length coding method of claim 9, wherein as said existing probability increases, said number of coding bits to be assigned decreases.

11. The variable length coding method of claim 9, wherein said analog signal is a luminance signal included in a television signal.

12. The variable length coding method of claim 9, wherein said analog signal is chrominance signal included in a television signal.

13. A variable length coding method for coding a television signal, containing a luminance signal having a first length in a horizontal direction and two kinds of chrominance signal having a second length in the horizontal direction, larger than the first length, to a digital signal, comprising the steps of:
(a) obtaining a digital signal in every field by sampling said television signal per field at a predetermined sampling frequency;
(b) dividing said digital signal in every field into a plurality of blocks;
(c) coding a digital signal equivalent for said luminance signal using a first bit map table; and
(d) coding a digital signal equivalent for said chrominance signal using a second bit map table, different from said first bit map table, wherein a greater number of bits are assigned to said two kinds of chominance signal as a result of said second length.

14. A variable length coding and recording method for coding an analog signal containing a first analog signal and a second analog signal, whose frequency components are different from each other, to a digital signal of variable length and recording medium, comprising:
(a) obtaining a first block having a predetermined number of sample signals and a first length in a horizontal direction, by sampling said first analog signal at a first sampling frequency;
(b) obtaining a second block having the predetermined number of sample signals and a second length in the horizontal direction, larger than said first length, by sampling said second analog signal at a second sampling frequency;
(c) coding said first block using a first bit map table;
(d) coding said second block using a second bit map table, different from said first bit map table, wherein a greater number of bits are assigned to said second block as a result of said second length; and
(e) recording data related to said first bit map table and said second bit map table on said recording medium.

15. A variable length coding and recording method for coding a television signal containing a luminance signal having a first length in a horizontal direction and two kinds of chrominance signal having a second length in the horizontal direction, larger than the first length, to a digital signal of variable length and recording the coded digital signal on a tape for a digital video cassette recorder, comprising:
(a) obtaining a first sub-block having a predetermined number of sample signals by sampling said luminance signal at a predetermined sampling frequency;
(b) obtaining two second sub-blocks, each of which has said predetermined number of sample signals, by sampling said two kinds of chrominance signal at half of said predetermined sampling frequency;
(c) coding said first sub-block using a first bit map table;
(d) coding said second sub-blocks using a second bit map table, different from said first bit map table, wherein a greater number of bits are assigned to said second sub-block as a result of said second length; and
(e) recording data related to said first bit map table and said second bit map table on said tape.

16. A variable length coding and recording method for coding a television signal, containing a luminance signal and two kinds of chrominance signal, to a digital signal of variable length and recording the coded digital signal on a tape for a digital video cassette recorder, comprising:
(a) obtaining blocks having a predetermined number of sample signals by sampling said luminance signal and chrominance signal respectively at a predetermined sampling frequency;
(b) performing a discrete cosine transform (DCT) for said each block and obtaining coefficients;
(c) scanning said coefficients in a predetermined order and obtaining a value R indicating a number of consecutive zero coefficients and a value S indicating an absolute value of each coefficient;
(d) computing an existing probability of the combination of said R and S;
(e) forming a bit map indicating a number of coding bits to be assigned in each combination of said R and S based on the existing probability;
(f) coding each coefficient according to said bit map; and
(g) recording on said tape, data related to said bit map in addition to data obtained by coding each coefficient.

* * * * *